United States Patent
Heukelbach et al.

(10) Patent No.: US 9,890,842 B2
(45) Date of Patent: Feb. 13, 2018

(54) DRIVE TRAIN DEVICE FOR A MOTOR VEHICLE

(71) Applicant: Daimler AG, Stuttgart (DE)

(72) Inventors: Kai Heukelbach, Koengen (DE); Bernd Koppitz, Winterbach (DE); Thomas Lechthaler, Bad Orb (DE); Lukas Rube, Stuttgart (DE); Tobias Schuster, Esslingen (DE); Bernhard Ziegler, Rechberghausen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 15/100,255

(22) PCT Filed: Nov. 25, 2014

(86) PCT No.: PCT/EP2014/003137
§ 371 (c)(1),
(2) Date: May 27, 2016

(87) PCT Pub. No.: WO2015/078576
PCT Pub. Date: Jun. 4, 2015

(65) Prior Publication Data
US 2017/0009864 A1    Jan. 12, 2017

(30) Foreign Application Priority Data

Nov. 28, 2013 (DE) .................. 10 2013 019 876

(51) Int. Cl.
*F16H 41/28* (2006.01)
*F16H 41/24* (2006.01)
*F16J 15/02* (2006.01)

(52) U.S. Cl.
CPC ............ *F16H 41/24* (2013.01); *F16J 15/022* (2013.01); *F16H 2041/243* (2013.01)

(58) Field of Classification Search
CPC .... F16J 15/022; F16H 41/24; F16H 2041/243
See application file for complete search history.

(56) References Cited

U.S. PATENT DOCUMENTS 2,839,826 A    6/1958 Farrell
3,138,107 A    6/1964 Zeidler
(Continued)

FOREIGN PATENT DOCUMENTS

DE    10 2007 059 406 A1    6/2008
EP    1 900 468 A2    3/2008
(Continued)

OTHER PUBLICATIONS

Japanese Office Action issued in Japanese counterpart application No. 2016-554805 dated Feb. 14, 2017, with partial English translation (Seven (7) pages).
(Continued)

*Primary Examiner* — Gilbert Y Lee
(74) *Attorney, Agent, or Firm* — Crowell & Moring LLP

(57) ABSTRACT

A drive train device for a motor vehicle is disclosed. The drive train device has at least one component which is included for the purpose of transmitting a torque, and at least one cast-in element which is partially cast into the component, which is included for the purpose of transmitting the torque, where the component and the cast-in element are made of different materials. The drive train device has a sealing device which is included for the purpose of sealing a junction between the component and the cast-in element.

7 Claims, 4 Drawing Sheets

(56) References Cited

U.S. PATENT DOCUMENTS

| | | | | |
|---|---|---|---|---|
| 3,250,222 | A | 5/1966 | Zeidler | |
| 5,168,702 | A * | 12/1992 | Sakakibara | F16H 41/28 60/345 |
| 5,221,183 | A * | 6/1993 | Hoeffken | F04D 29/4226 29/509 |
| 5,224,348 | A * | 7/1993 | Ejiri | F16H 41/04 60/361 |
| 5,950,483 | A * | 9/1999 | Schneider | F16H 41/24 29/889.5 |
| 6,044,946 | A * | 4/2000 | Makino | F16H 41/28 192/113.5 |
| 7,032,729 | B2 * | 4/2006 | Prater | F16H 41/24 192/112 |
| 7,850,426 | B2 * | 12/2010 | Wang | F16H 41/24 415/213.1 |

FOREIGN PATENT DOCUMENTS

| | | |
|---|---|---|
| GB | 789361 | 1/1958 |
| JP | 2009-168116 A | 7/2009 |

OTHER PUBLICATIONS

PCT/EP2014/003137, International Search Report (PCT/ISA/210) dated May 29, 2015, with partial English translation, enclosing Written Opinion of the International Searching Authority (PCT/ISA/237) (Twelve (12) pages).

German Search Report issued in German counterpart application No. 10 2013 019 876.3 dated Jul. 25, 2014 (Eight (8) pages).

* cited by examiner

DRIVE TRAIN DEVICE FOR A MOTOR VEHICLE

BACKGROUND AND SUMMARY OF THE INVENTION

The invention relates to a drive train device for a motor vehicle.

A drive train device for a motor vehicle has already been known from EP 1 900 468 A2, and also from U.S. Pat. No. 3,138,107A, having a component and having an element which is partially cast into the component, wherein the component and the cast-in element are made of different materials.

A generic drive train device for a motor vehicle is known from JP2009168116A, having at least one component included for the purpose of transmitting a torque, and at least one element which is partially cast into the component, the element included for the purpose of transmitting the torque, wherein the component and the cast-in element are made of different materials, and wherein the component is indirectly connected, in a manner which transmits torque, to at least one further component which is included for the purpose of transmitting a torque, via the cast-in element, in such a manner that the torque can only be transmitted between the components via the cast-in element.

The invention particularly addresses the problem of economically producing a drive train device using lightweight construction. This problem is addressed by an embodiment according to the invention of a drive train device.

The invention proceeds from a drive train device for a motor vehicle, having at least one component for transmitting a torque, and having at least one element partially cast into the component, to transmit the torque, wherein the component and the cast-in element are made of different materials.

It is suggested that the drive train device has a sealing device that is included for the purpose of sealing a junction between the component and the cast-in element. The element which is cast into the component enables the component to have an indirect, torque-transmitting connection, via the cast-in element, to at least one further component which serves the purpose of transmitting a torque, thereby allowing the torque to be transmitted between the components via the cast-in element. As a result, it is possible for the component comprising the cast-in element to be made of a first material, and the further component to be made of a second material which differs from the first material, thereby making it possible to design the production of the drive train device more flexibly, particularly as regards the selection of a connection method for the torque-transmitting connection of the components. The material of the cast-in element can be adapted to the material of the further component in anticipation of a connection to the further component, and as a result the connection between the components can be designed in a particularly reliable, robust, and cost-effective manner without the need to accept restrictions in the selection of the materials of the components. In particular, one of the components can be constructed of a particularly light material compared to the other component, so that the drive train device can have a particularly light construction in terms of its weight, thereby enabling a reduction in fuel consumption by the motor vehicle which comprises the drive train device.

The fact that the component and the element which is cast into the component consist of different materials can negatively influence a seat of the cast-in element in the component in terms of tightness, in particular due to different thermal expansion coefficients, whereby a leakage may occur through the junction. Due to the seal unit which is included for the purpose of sealing the junction where the component and the cast-in element are connected by means of a positive-fit casting, it is possible to prevent a potential leakage through the junction. This can ensure tightness of the junction and therefore of the torque transmitting connection between the components, such that it is possible to reliably prevent a leakage in the drive train device. The drive train device can be especially economically produced in lightweight construction without reducing the quality of the drive train device, The term "cast-in element" should be understood in particular to mean an element which can be connected with a positive fit to the cast component by means of a casting process, in particular a die casting process, of the cast component. The cast-in element advantageously has an annular shape, whereby the connection between the component and the cast-in element can be made more reliable. The term "partially cast into the component" should be understood in particular to mean that the cast-in component has at least one side which protrudes from the material of the component. The term "junction" is used particularly to mean a place where the component and the element which is cast into the component are positively connected to each other due to a casting of the component. Preferably, the material of the component which comprises the cast-in element, and the material of the cast-in element, are different in terms of a coefficient of thermal expansion. The term "sealing device" is particularly used to mean a unit which is intended to provide a sealing effect for sealing the junction, wherein the sealing effect can be provided by at least one sealing element, by a special arrangement of at least one component and/or element of the drive train device, by a special shaping of at least one component and/or element of the drive train device, by a special material of at least one component and/or element of the drive train device and/or by a special surrounding casting of the cast-in element. The term "included" should particularly be understood to mean specially designed, formed, furnished and/or arranged.

It is particularly advantageous if the component which comprises the cast-in element at least substantially consists of a material formed as a light metal, and the cast-in element at least substantially consists of a predominantly ferrous material, such that the weight of the drive train device can be reduced. The term "light metal" is particularly used to mean a metal and/or alloy with a density less than 5 $g/cm^3$, such as, in particular, aluminum. The term "substantially" is particularly used to mean at least 60%, advantageously at least 80%, and particularly advantageously at least 90%.

It is further suggested that the drive train device comprises at least one further component which is included for transmitting the torque, and which at least partially encloses an inner space together with the other component, wherein the sealing device is included for the purpose of sealing the junction and the inner space against each other. It is possible in this way to prevent a leakage, in particular an oil leakage, from the inner space through the junction and into a surrounding area.

The further component consists advantageously at least substantially of a predominantly ferrous material. Preferably, the cast-in element is designed as a connecting element which is materially joined to the further component for the purpose of producing a. torque-transmitting connection between the components. The material joining makes it possible to dispense with a complex and costly method of connection, in particular screws, rivets and welding rivets, such that it is possible to reduce costs of the drive train device in lightweight construction. This allows at least two components of the drive train device to be connected to each other, wherein one of the components is formed as a light metal material, in a particularly cost-effective, and torque-transmitting, manner, such that a drive train device can be manufactured economically in lightweight construction. Preferably the cast-in element and the further component are welded and/or soldered to each other.

It is also suggested that the sealing device is included for the purpose of providing a sealing force, due to an at least partially elastic deformation and/or due to adhesion, to seal the junction, such that the junction can be particularly reliably sealed. The sealing device, which is included for the purpose of providing a sealing force, based on an at least partially elastic deformation, for sealing the junction, preferably has at least one at least partially elastic sealing element that provides its sealing effect, in particular following its at least partially elastic deformation. The at least partially elastic sealing element is advantageously designed as a gasket, as a sealing ring, or the like. Preferably, the at least partially elastic sealing element consists at least partly of rubber, natural rubber, polyethylene, polytetrafluoroethylene or the like. In principle, the at least partially elastic sealing element can also at least partly consist of metal, such as copper. It can also be contemplated in principle that the sealing device, which is included to provide the sealing force, based on the at least partially elastic deformation, to seal the junction, is designed as a single piece together with one of the components or the cast-in element. The sealing device, which is included for the purpose of providing a sealing force, based on adhesion, for sealing the junction, preferably has at least one adhesive sealing element Which provides its sealing effect particularly after it cures. The adhesive sealing element is advantageously designed as a silicone rubber, a silicone elastomer, a synthetic polymer or the like. Further, it can be contemplated in principle that the sealing device is realized by selective casting of the component at least in the area of the junction.

In particular, it is advantageous if the sealing device has at least one sealing element which is arranged between the two components in a manner providing a seal, such that a particularly high sealing force can be produced. The term "sealing element which is arranged between the two components in a manner providing a seal" is used to particularly mean a sealing element which contacts both components and seals the same.

Further, it is advantageous if the sealing device has at least one sealing element which is arranged between at least one of the components and the cast-in element in a manner providing a seal, such that the assembly of the two components can be simplified. The term "sealing element which is arranged between at least one of the components and the cast-in element in a manner providing a seal" is used to particularly mean a sealing element which contacts at least one of the components and the cast-in element, and seals the same.

Further, it is advantageous if at least one of the components has at least one sealing element receptacle which at least particularly receives a sealing element, such that the assembly of the sealing element can be simplified.

In order to arrange the sealing element in a sealing manner between the two components, in another embodiment according to the invention at least one of the components engages at least partially in the sealing element receptacle, such that the sealing element which is used for sealing the junction can be at least partially elastically deformed by the engaging component.

Furthermore, it is suggested that at least one of the components has a movement constraint for the sealing element, which is included for the purpose of at least impeding a movement of the sealing element in the sealing element receptacle, such that a secure seat of the sealing element can be produced. The movement constraint is advantageously designed as a groove in which the sealing element is arranged within the sealing element receptacle. Preferably, the movement constraint can also be formed by a roughened or textured surface in the sealing element receptacle. The term "roughened surface" is used to particularly mean a surface having a macroscopic roughness with an average roughness of 0.05 to 0.2 millimeters. The term "structured surface" is particularly used to mean a surface having a macroscopic roughness with an average roughness of 0.1 to 1.5 millimeters. Preferably, the textured surface has bumps and depressions visible to the naked eye, such as grooves, ridges, nubs or the like.

In one advantageous embodiment, the cast-in element is included for the purpose of at least partially forming the sealing device due to its shape, such that the junction can be sealed in a particularly compact manner which simplifies assembly. Preferably, a part of the cast-in element which is completely surrounded by the material of the cast component has a shape which is intended to form the sealing device, such that the junction can be sealed invisibly from the outside. Advantageously, the part of the cast-in element which is completely surrounded by the material of the cast component is shaped in such a manner that the cast component is shrink-fitted onto the cast-in element during or as a result of a cooling of the material of the cast component after the casting process. The term "cast component" is particularly used to mean the component into which the cast-in element is partially cast.

Further, it is advantageous if the cast-in element has at least one undercut which is surrounded by the material of the cast component, which is intended to at least partly form the sealing device. In this way, the part of the cast-in element which is completely surrounded by the material of the east component can be used to produce the sealing effect, such that there is no need for separate sealing elements.

It is particularly advantageous if at least one of the components at least partially forms a torque converter housing, such that a torque converter can be manufactured in lightweight construction in an economical manner. Due to the material connection of the cast-in element to the additional component, it is also possible to avoid a complicated adjustment of an axial clearance between components, wherein particularly during assembly of the torque converter housing it is possible to dispense with compensating elements which, for example, are necessary for a bolted connection. The term "torque converter housing" is particularly used to mean a housing which at least partially surrounds and/or receives at least one component of the torque converter.

It is particularly advantageous if one of the components forms an impeller and the other component at least partially forms an outer disk carrier, such that a cost-effective torque converter can be provided with a lock-up clutch in lightweight construction.

In addition, a manufacturing method for manufacturing a drive train device of a motor vehicle, in particular a drive train device according to the invention, is suggested, wherein a junction between a component included for the purpose of transmitting a torque, the same consisting of a first material, and at least one element which is partially cast into the component and is included for the purpose of transmitting the torque, the same made of a second material which is different from the first material, is sealed before another component included for the purpose of transmitting the torque is connected to the cast-in element.

Further advantages are found in the following description of the figures. Eight embodiments of the invention are shown in the figures. The figures, the figure description and the claims contain numerous features in combination. A person skilled in the art will also consider the features individually and combine them into additional, meaningful combinations.

DETAILED DESCRIPTION OF THE DRAWINGS

Figure 1:
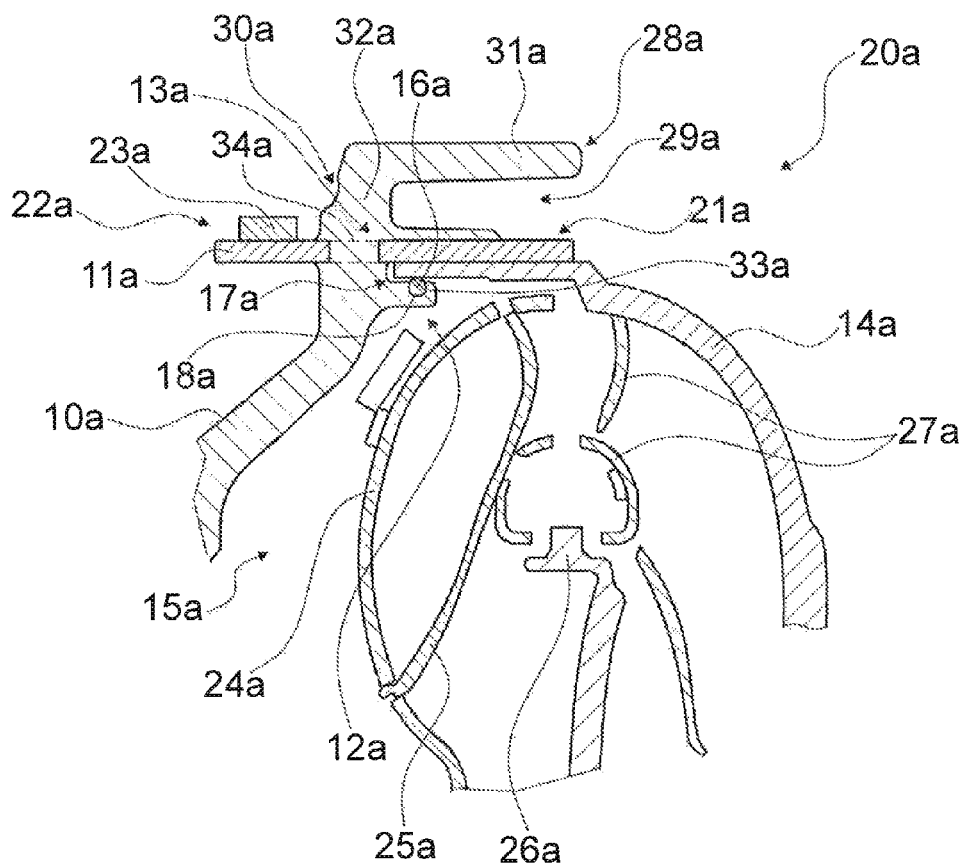
FIG. 1 partially and schematically shows a drive train device having a component designed as a pump impeller of a torque converter, a component designed as an outer disk carrier of a converter lock-up clutch, an element which is cast into the component designed as an outer disk carrier, the element connected materially to the component designed as a pump impeller, and having a seal device which seals a junction between the component designed as an outer disk carrier and the cast-in element.

FIG. 1 shows a drive train device for a motor vehicle which is not illustrated, which is provided for a drive train of the motor vehicle. The drive train device comprises an automatic transmission, which is not shown, and a hydraulic torque converter 20a with a lock-up clutch. The torque converter 20a in this case has an impeller, a turbine Wheel and an idler. The lockup clutch has an outer disk carrier which is connected to the impeller in a torque-proof manner, and an inner disk carrier which is connected to the turbine wheel in a torque-proof manner.

The drive train further has a first component 10a which is included for transmitting a torque, and a second component 14a which is included for transmitting a torque, the same connected to each other to transmit torque. To receive the first component 10a and the second component 14a, the drive train device has a housing, which is not shown in greater detail, within which the first component 10a and the second component 14a are arranged. The first component 10a and the second component 14a in this case are mounted in a manner allowing rotation relative to the unseen housing.

The first component 10a and the second component 14a are made of different materials. The first component 10a is made of a different material than the second component 14a. In order to realize a lightweight construction, the first component 10a consists of a material formed as a light metal. The first component 10a is made of aluminum. In this case, the first component 10a is designed as a cast part. The first component 10a is thus cast. The second component 14a is made of a predominantly ferrous material. The second component 14a is made of steel.

To connect the first component 10a and the second component 14a to each other to transmit torque, the drive train device has an element 11a which transmits the torque between the first component 10a and the second component 14a. The element 11a is partially cast into the first component 10a. In this case, the cast-in element 11a is made of a different material than the first component 10a. The cast-in element 11a is made of a predominantly ferrous material, it is made of steel. As a result of the casting, a positive connection is produced at a junction 13a between the first component 10a, made of aluminum, and the element 11a made of steel. The cast-in element 11a is designed as a connecting element which produces the torque-transmitting connection between the first component 10a and the second component 14a. For this purpose, the element 11a cast into the first component 10a is connected by a material bond to the second component 14a. The cast-in element 11a and the second component 14a thus have a materially-bonded junction 13a. In this embodiment, the second component 14a, made of steel, and the cast-in element 11a made of steel are welded together. They are connected to each other by a welded junction. The second component 14a made of steel and the first component 10a made of aluminum are connected to each other via the element 11a cast into the first component 10a in a torque-transmitting manner. The material junction 13a is formed as a weld. The first component 10a and the second component 14a are connected to each other by means of a steel-steel junction. In principle, the second component 14a and the cast-in element 11a can alternatively or additionally be soldered and/or glued together. In order to save costs, the cast-in element 11a can in principle be layered from metal strips like a jigsaw puzzle, The cast-in element 11a projects axially on both sides out of the material of the first component 10a. The cast-in element 11a has a first side 21a which projects axially out of the material of the first component 10a, and a second side 22a which projects axially from the material of the first component 10a. The first axially projecting side 21a of the cast-in element 11a is intended for the material bond to the second component 14a. The cast-in element 11a is materially bonded to the second component 14a by the first axially protruding side 21a. The axially opposite, second axially projecting side 22a of the cast-in element 11a is included for the purpose of balancing. The second axially outstanding side 22a has a balancing element 23a for the purpose of balancing. The balancing element 23a is fixed, to eliminate an imbalance on the second axially projecting side 22a, on the cast-in element 11a. The balancing element 23a is designed as a balancing plate. In principle, the second axially projecting side 22a, used for balancing, can additionally or alternatively comprise at least one balance recess which is designed as a material void. Further, it can be contemplated in principle that a positive balancing by means of a CMT welding on the second axially projecting side 22a is carried out.

To make a cast connection between the first component 10a and the cast-in element 11a more reliable, the cast-in element 11a has multiple material voids 34a which, once cast-in, are filled in by the material of the first component 10a. The material voids 34a in this case are arranged axially between the axially projecting sides 21a, 22a. The material voids 34a are arranged equally around a circumference of the cast-in element 11a. They are designed as bore holes. The first component 10a and the cast-in element 11a are illustrated in a cross-section of such a material void 34a. The cast-in element 11a has an annular shape. It is designed as a connecting ring.

The first component 10a and the second component 14a enclose an inner space 15a Which is filled, at least during operation, with a liquid operating fluid. The first component 10a and the second component 14a form a torque converter housing of the torque converter 20a. Components 24a, 25a, 26a, 27a of the torque converter 20a are arranged in the inner space 15a and therefore inside the first component 10a and the second component 14a. The first component 10a forms, as a single piece, the outer disk carrier of the converter lock-up clutch, and the second component 14a forms, as a single piece, the impeller of the torque converter 20a. The operating fluid which fills the inner space 15a at least during operation is designed as oil.

The component 24a arranged inside the components 10a, 14a is designed as a turbine wheel, the components 25a arranged inside of the components 10a, 14a are each designed as turbine wheel vanes, the component 26a arranged inside the components 10a, 14a is designed as an idler, and the components 27a arranged inside of the components 10a, 14a are each designed as an impeller vane of the torque converter 20a. As such, the outer disk carrier is made of aluminum, and is connected by the cast-in element 11a to the impeller, made of steel, of the torque converter 20a, wherein the impeller and the cast-in element 11a are welded together. In principle, the first component 10a can be simply fixed to the outer disk carrier of the converter lockup clutch, and the second component 14a can be simply fixed to the impeller of the torque converter 20a.

The drive train device further includes a scooping device 28a, which upon rotation carries a coolant out of a cooling sump due to adhesion, and thereby scoops the same. The scooping device 28a in this case conveys the coolant to a higher level, from where it then flows down due to gravity over the first component 10a and over the second component 14a. The first component 10a forms, as a single piece, the scooping device 28a. The scooping device 28a is arranged radially outside of the cast-in element 11a with respect to an axis of rotation of the first component 10a and the second component 14a. The scooping device 28a surrounds the first axially projecting side 21a of the cast-in element 11a. The coolant in this case is designed as an oil.

The scooping device 28a has a first end-face material void 29a and an opposite second end-face material void 30a. The material voids 29a, 30a form grooves which are open in the axial direction. They each run around the circumference of the end face of the scooping device 28a. The first material void 29a is arranged radially above the first axially projecting side 21a of the cast-in element 11a with respect to the axis of rotation. The material voids 29a, 30a have different proportions. The first material void 29a in this case is larger than the second material void 30a. The first material void 29a is axially deeper than the second material void 30a. The material voids 29a, 30a are in each case formed by the casting of the first component 10a. They are each annular.

Due to the axially opposite material voids 29a, 30a, the scooping device 28a has a scoop ring 31a and a material constriction 32a. The material constriction 32a connects the first component 10a and the scoop ring 31a to each other as a single piece. The scoop ring 31a is arranged radially above the material constriction 32a. The scoop ring 31a and the material constriction 32a run around a circumference of the first component 10a. Proceeding from the material constriction 32a, the scoop ring 31a has various different axial extensions. In this case, one axial extension of the scoop ring 31a, proceeding from the material constriction 32a and moving toward the first axially projecting side 21a of the cast-in element 11a, is larger than an axial extension of the scoop ring 31a proceeding from the material constriction 32 and moving toward the second axially projecting side 22a of the cast-in element 11a. The scoop ring 31a extends from the material constriction 32a axially and substantially toward the first axially projecting side 21a of the cast-in element 11a. The scoop ring 31a covers the first axially projecting side 21a of the cast-in element 11a. The scoop ring 31a therefore covers the materially bonded junction 13a between the second component 14a and the cast-in element 11a. There is no covering of the second axially projecting side 22a of the cast-in element 11a by the scoop ring 31a. Therefore, there is no covering of the balancing element 23a by the scoop ring 31a. In a cross-section along the axis of rotation corresponding to FIG. 1, the scooping device 28a has an anvil shape. In this case, the scoop ring 31a. arranged radially above the material constriction 32a extends axially and substantially toward the first axially projecting side 21a of the cast-in element 11a.

To ensure that the junction 13a between the first component 10a and the cast in element 11a is impermeable to liquid, the drive train device has a sealing device 12a which seals the junction 13a between the first component 10a and the cast-in element 11a in a fluid-tight manner. The sealing device 12a seals the junction 13a and the inner space 15a against each other and thus prevents the operating fluid from exiting the inner space 15a inadvertently through the junction 13a.

The sealing device 12a is intended to produce a sealing force, due to an elastic deformation, to seal the junction 13a. The sealing device 12a has an elastically deformable sealing element 16a which seals the junction 13a between the first component 10a and the cast-in element 11a in a fluid-tight manner. The sealing element 16a provides a sealing function only after its elastic deformation. In principle, the sealing device 12a can be formed as a single piece by the first component 10a and/or by the second component 14a, for example by a material protrusion or the like.

The sealing element 16a is arranged inside of the first component 10a. The first component 10a surrounds the sealing element 16a. The sealing element 16a runs around the axis of rotation of the components 10a, 14a. It is designed as continuous. The sealing element 16a is constructed separately from the components 10a, 14a. The sealing element 16a is designed as a sealing ring. The sealing element 16a is made of rubber. In principle, the sealing element 16a can also be made of another material which provides a sealing effect due to an at least partially elastic behavior—such as copper. Further, it can be contemplated in principle that the sealing device 12a has a plurality of sealing elements. The sealing element 16a has a round cross-section. In principle, the cross-section can also be elliptic, polygonal or the like. Further, it can be contemplated that the sealing element 16a runs around the axis of rotation in a coiled, twisted, curved or similar path.

The sealing element 16a is arranged between the first component 10a and the second component 14a in a manner providing a seal. It directly contacts the first component 10 and the second component 14a. The sealing element 16a is clamped between the first component 10a and the second component 14a. The sealing element 16a is arranged inside of the second component 14a. The second component 10a surrounds the sealing element 16a.

For the arrangement of the sealing element 16a, the first component 10a has a sealing element receptacle 17a which receives the sealing element 16a. The sealing element receptacle 17a is designed as a material void. The sealing element receptacle 17a is open in the direction of the second component 14a. It is ring-shaped. The sealing element receptacle 17a is designed in the form of a groove which is open in the axial direction. The sealing element receptacle 17a is arranged radially inside the cast-in element 11a with respect to the axis of rotation of the components 10a, 14a. The sealing element receptacle 17a is bounded axially in a direction facing away from the second component 14a, and radially in as direction facing the axis of rotation, by the first component 10a. In a direction facing away from the axis of rotation, the sealing element receptacle 17a is bounded radially by the cast-in element 11a. In principle, the sealing element receptacle 17a can he designed in the shape of a groove, a notch, a pocket or the like.

To form the sealing element receptacle 17a, the first component 10a has a projection 33a. The projection 33a is arranged radially below the cast-in element 11a. It extends from a surface of the first component 10a facing the second component 14a axially in the direction of the second component 14a. The sealing element 16a is supported on the projection 33a. It is arranged on the projection 33a. The sealing element receptacle 17a is formed by the casting of the first component 10a.

For the locational securement of the sealing element 16a, the first component 10a has a movement constraint 18a for the sealing element 16a, which impedes an axial movement of the sealing element 16a in the sealing element receptacle 17a. The movement constraint 18a positions the sealing element 16a in the sealing element receptacle 17a. It positions the sealing element 16a on the projection 33a. The movement constraint 18a is designed as a depression in the sealing element receptacle 17a which is included for the purpose of receiving the sealing element 16a. The movement constraint 18a is inserted into the projection 33a. It is open radially toward the cast-in element 11a. The movement constraint 18a fixes the sealing element 16a axially onto the projection 33a. A shape of the movement constraint 18a is adapted to a shape of the sealing element 16a. The movement constraint 18a is designed as a groove. In principle, the movement constraint 18a can also be designed as a roughened or textured surface.

To provide the sealing force, the second component 14a engages into the sealing element receptacle 17a. The second component 14a, engaging in the sealing element receptacle 17a, deforms the sealing element 16a. The second component 14a presses the sealing element 16a radially against the first component 10a. It presses the sealing element 16a radially against the projection 33a. The second component 14a is arranged partially radially between the cast-in element 11a and the projection 33a. The second component 14a is inserted into the sealing element receptacle 17a. As an alternative or in addition thereto, the second component 14a can comprise a movement constraint which impedes the movement of the sealing element 16a in the sealing element receptacle 17a.

In a manufacturing method for manufacturing the drive train device, the element 11a which is made of a ferrous material and which is designed as a connecting element is cast into the first component 10a, made of a material formed as a light metal, in order to produce a positive connection between the first component 10a and the east-in element 11a. For the bonding to the second component 14a, and for balancing, the cast-in element 11a is cast in such a manner that it projects axially on both sides from the material of the first component 10a.

The junction 13a between the first component 10a and the cast-in element 11a is then sealed before the second component 14a is connected to the cast-in element 11a in a manner which transmits torque. For this purpose, the sealing element 16a is pressed onto the projection 33a until it is taken into the movement constraint 18a.

Subsequently, the inner components 24a, 25a, 26a, 27a are pre-assembled in a pre-assembly step in the first component 10a and the second component 14a, before the second component 14a and the cast-in element 11a are connected to each other with a material bond. After the pre-assembly of the inner components 24a, 25a, 26a, 27a, the proper axial clearance is set between the first component 10a and the second component 14a. Subsequently, the second component 14a is pushed into the sealing element receptacle 17a, whereby the sealing element 16a is then deformed by the second component 14a. The deformation of the sealing element 16a by means of the second component 14a seals the junction 13a between the first component 10a and the cast-in element 11a. Then the first component 10a and the second component 14a are connected to each other in a torque transmitting manner. To connect the first component 10a, made of a material which is formed as a light metal, to the second component 14a, made of the ferrous material, in a manner which transmits torque, the first axially projecting side 21a of the cast-in element 11a which is cast into the first component 10a is materially connected to the second component 14a. In this case, the cast-in element 11a and the second component 14a are welded together. The torque-transmitting connection of the first component 10a to the second component 14a is created without clearance-compensation elements.

For this purpose, the sealing element 16a is first inserted into the sealing element receptacle 17a, the components 24a, 25a, 26a, 27a arranged inside the first component 10a and the second component 14a are axially adjusted with respect to each other with the correct clearance, the second component 14a is inserted into the sealing element receptacle 17a to seal the junction 13a, and only then are the second component 14a and the cast-in element 11a welded together. No clearance compensation elements, such as shims, are required.

Seven further embodiments of the invention are shown in FIGS. 2 to 8. The following descriptions are substantially restricted to the differences between the embodiments, and reference can be made to the description of the other embodiments, particularly FIG. 1, for components, features, and functions which are the same. To distinguish the embodiments, the letter a in the reference numbers in the embodiment in FIG. 1 has been replaced by the letters b to h in the reference numerals of the embodiments in FIGS. 2 to 8. With regard to components with the same indication, in particular with regard to components with the same reference numbers, reference can also be made in general to the drawings and/or the description of the other embodiments, particularly in FIG. 1.

Figure 2:
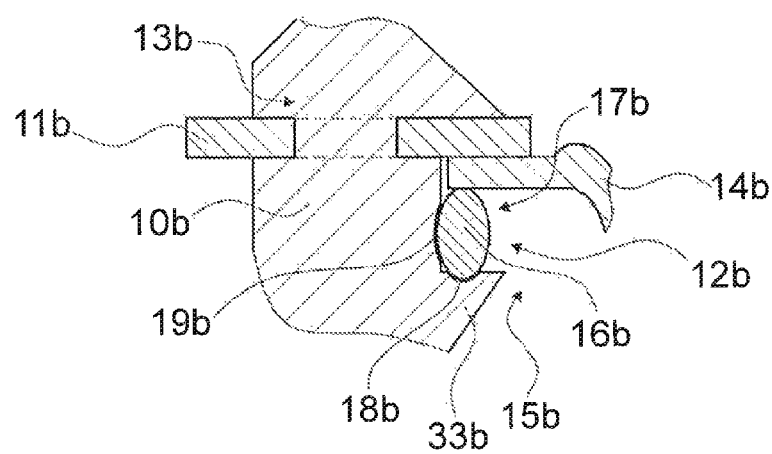
FIG. 2 shows a drive train device having an alternatively designed sealing device.

FIG. 2 shows a schematic detail of a drive train device for a motor vehicle in a second embodiment. The drive train device has a first component 10b, an element 11 which is partially cast into the first component 10b, and a second component 14b which is connected to the cast-in element 11b by a material bond. To seal a junction 13b between the first component 10b and the cast-in element 11b, the drive train device has a sealing device 12b with a sealing element 16b which seals the junction 13b against the inner space 15b enclosed by the first component 10b and the second component 14b. For the arrangement of the sealing element 16b, the first component 10b has a sealing element receptacle 17b which receives the sealing element 16b. To form the sealing element receptacle 17b, the first component 10b has a projection 33b.

In contrast to the previous embodiment, the first component 10b has, for the locational securement of the sealing element 16a, two movement constraints 18b, 19b which impede a movement of the sealing element 16b in the sealing element receptacle 17b in two different directions. The first movement constraint 18b is included for the purpose of impeding an axial movement of the sealing element 16b in the sealing element receptacle 17b, and therefore onto the projection 33b. The second movement constraint 19b is included for the purpose of impeding an axial movement of the sealing element 16b in the sealing element receptacle 17b, and therefore particularly onto the projection 33b. Both movement constraints 18b, 19b are designed as a depression which is included for the purpose of receiving the sealing element 16b. The first movement constraint 18b is inserted into the projection 33b. The first movement constraint 18b is open radially toward the cast-in element 11b. The second movement constraint 19b is inserted in a material of the first component 10a which axially bounds the sealing element receptacle 17b. The second movement constraint 19b is open axially in the direction of the second component 14b. The movement constraints 18b, 19b fix the sealing element 16b radially and axially on the projection 33b.

Figure 3:
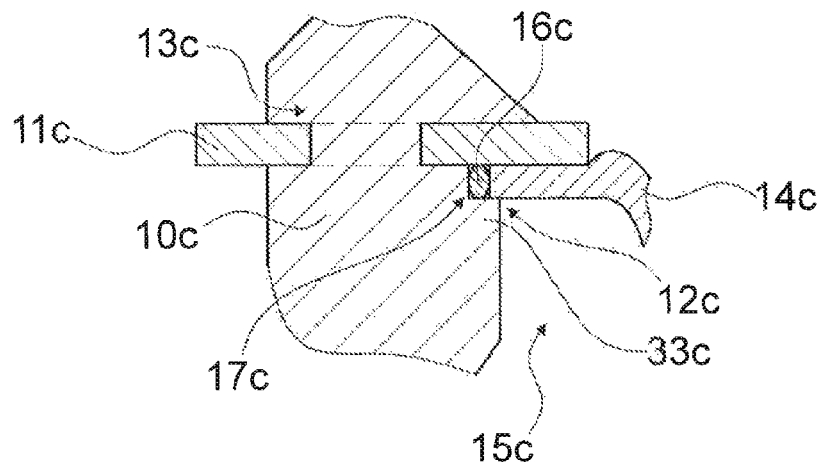
FIG. 3 shows a drive train device having a sealing device in a third embodiment.

FIG. 3 schematically illustrates a drive train device for a motor vehicle in a third embodiment. The drive train device includes a first component 10c, an element 11c which is partially cast into the first component 10c, and a second component 14c which is connected to the cast-in element 11c by a material bond. To seal a junction 13c between the first component 10c and the cast-in element 11c, the drive train device has a sealing device 12c with a sealing element 16c, which seals the junction 13c against the inner space 15c enclosed by the first component 10c and the second component 14c. For the arrangement of the sealing element 16b, the first component 10c has a sealing element receptacle 17c which receives the sealing element 16c. To form the sealing element receptacle 17c, the first component 11c has a projection 33c.

In contrast to the previous embodiments, the sealing element 16c is arranged between the first component 10c, the second component 14c, and the cast-in element 11b in a manner providing a seal. It directly contacts the first component 10 and the second component 14a, as well as the cast-in element 11c. The sealing element 16c is clamped between the first component 10c and the second component 14c.

To provide the sealing force, the second component 14c engages into the sealing element receptacle 17c. The second component 14c, engaging in the sealing element receptacle 17c, deforms the sealing element 16c. In contrast to the previous embodiments, the second component 14c presses the sealing element 16c against a material of the first component 10c which bounds the sealing element receptacle 17c in the axial direction. The second component 14c presses the sealing element 16c axially against the first component 10c. As a result of the deformation produced in this way, the sealing element 16c presses against the first component 10c, against the second component 14c, and against the cast-in element 11c. The sealing element 16c is arranged axially between the first component 10c and the second component 14c.

In further contrast to the previous embodiments, the first component 10c and the second component 14c are missing a movement constraint.

Figure 4:
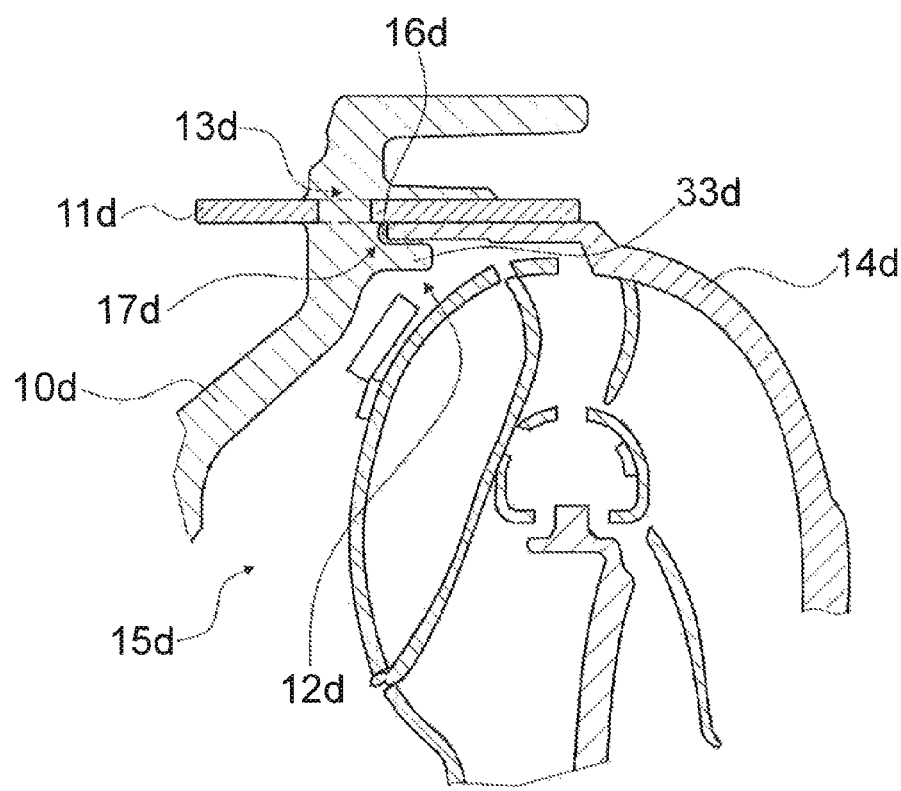
FIG. 4 shows a drive train device having a sealing device in a fourth embodiment.

FIG. 4 schematically illustrates a drive train device for a motor vehicle in a fourth embodiment. The drive train device includes a first component 10d, an element 11d which is partially cast into the first component 10d, and a second component 14d which is connected to the cast-in element 11d by a material bond. To seal a junction 13d between the first component 10d and the cast-in element 11d, the drive train device has a sealing device 12d with a sealing element 16d, which seals the junction 13d against the inner space 15d enclosed by the first component 10d and the second component 14d. For the arrangement of the sealing element 16d, the first component 10d has a sealing element receptacle 17d which receives the sealing element 16d. To form the sealing element receptacle 17d, the first component 10d has a projection 33d.

In contrast to the previous embodiments, the sealing device 12d is included for the purpose of providing a sealing force, due to adhesion, to seal the junction 13d. The sealing device 12d has an adhesive sealing element 16d which seals the junction 13d between the first component 10d and the cast-in element 11d in a fluid-tight manner. The sealing element 16d adheres to the first component 10d, to the second component 14d, and to the cast-in element 11d to seal the junction 13d. The sealing element 16d has an adhesion to the material of the first component 10d, to the material of the second component 14d, and to the material of the cast-in element 11. In principle, the sealing element 16d can adhere to only the first component 10d and to the cast-in element 11d, or to only the first component 10d and the second component 14d. As such, the sealing element 16d can, in principle, have only an adhesion to the material of the first component 10d and to the material of the second component 14d, or only an adhesion to the material of the first component 10d and to the material of the cast-in element 11d. The sealing element 16d at least partially fills in the sealing element receptacle 17d. The sealing element 16d substantially fills in a gap between the first component 10d, the second component 14d, and the cast-in element 11d.

The sealing element 16d provides a sealing function immediately following the curing thereof. It seals the junction 13d regardless of the second component 14d. The sealing element 16d is designed as a sealing compound. The sealing element 16d is made of silicone. In principle, the sealing element 16d can he formed from a different sealing compound which provides a sealing effect by means of adhesion, such as polyurethane for example. For sealing the junction 13d, the sealing element 16d is injected, foamed, cast, filled, or the like into the sealing element receptacle 17d. After the curing of the sealing element 16d in the sealing element receptacle 17d, possibly with the aid of the influencing of at least one environmental parameter such as temperature, the first component 10d and the second component 14d are connected to each other by means of the cast-in element 11d.

Figure 5:
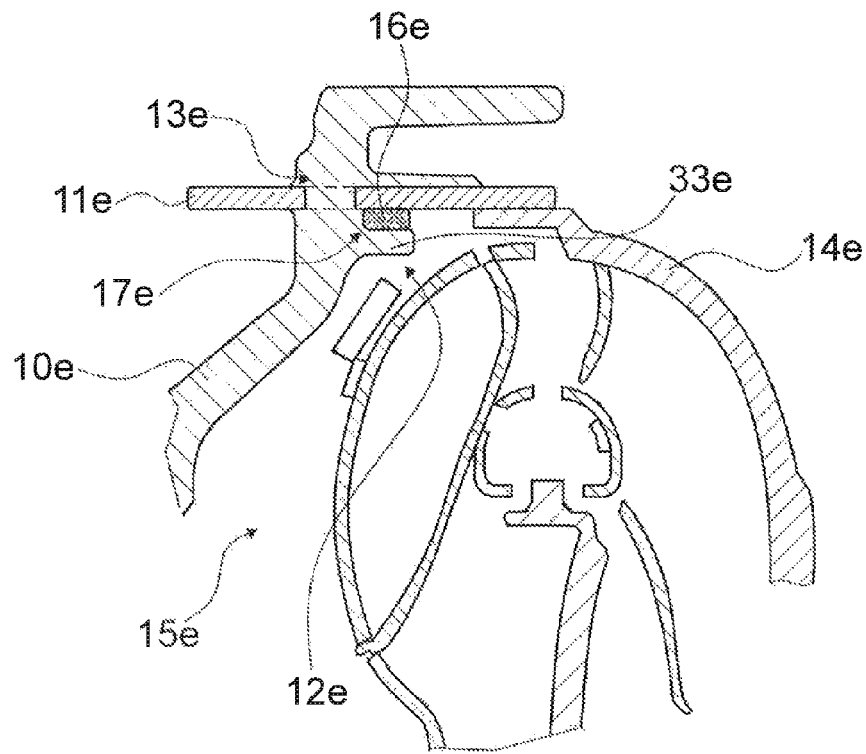
FIG. 5 shows a drive train device having a sealing device in a fifth embodiment.

FIG. 5 schematically illustrates a drive train device for a motor vehicle in a fifth embodiment. The drive train device has a first component 10e, an element 11c which is partially cast into the first component 10e, and a second component 14e which is connected to the cast-in element 11e by a material bond. To seal a junction 13e between the first component 10e and the cast-in element 11e, the drive train device has a sealing device 12e with a sealing element 16e, which seals the junction 13e against the inner space 15e enclosed by the first component 10e and the second component 14e. For the arrangement of the sealing element 16e, the first component 10e has a sealing element receptacle 17e which receives the sealing element 16e. To form the sealing element receptacle 17e, the first component 10e has a projection 33e. The sealing element 46e is designed as an adhesive sealing element.

In contrast to the previous embodiments, the second component 14e is missing an engagement into the sealing element receptacle 17e. The second component 14e lacks a contact to the sealing element 16e. The sealing element 16e is arranged between the first component 10e and the cast-in element 11e in a manner providing a seal. It only contacts the first component 10e and the cast-in element 11e in a manner providing a seal. The sealing element 16e substantially fills in the sealing element receptacle 17e. By dispensing with an engagement of the second component 14e into the sealing element receptacle 17e, it is possible to prevent damage to the sealing element 16e.

Figure 6:
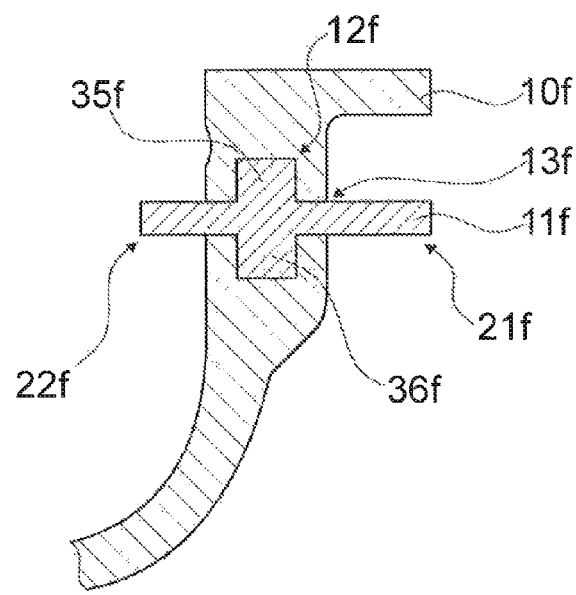
FIG. 6 shows a drive train device having a sealing device in a sixth embodiment.

FIG. 6 schematically illustrates a drive train device for a motor vehicle in a sixth embodiment. The drive train device has a first component 10f, an element 11f which is partially cast into the first component 10f, and a second component 14f which is connected to the cast-in element 11f by a material bond. To seal a junction 13f between the first component 10f and the cast-in element 11f, the drive train device has a sealing device 12f which seals the junction 13f against the inner space 15f enclosed by the first component 10f and the second component 14f.

In contrast to the previous embodiments, the cast-in element 11f forms the sealing device 12f by its shape. To form the sealing device 12f, a part of the cast-in element 11f which is entirely surrounded by the material of the first component 10f has a special shape which forms the sealing device 12f by means of encapsulation with the first component 10f. The sealing device 12f is formed by an interaction of the specially shaped portion of the cast-in element 11f which is entirely cast into the component 10f, and the material of the first component 10f, which surrounds the specially shaped portion of the cast-in element 11f.

To form the sealing device 12f, the part of the cast-in element 11f which is entirely surrounded by the material of the first component 10f has a special shape. The portion of the cast-in element 11f which is surrounded by the material of the first component 10f is shaped in such a manner that the first component 10f is shrink-fitted onto the cast-in element 11f as a result of a cooling after the casting process, thereby sealing the junction 13f. The portion of the cast-in element 11f which is surrounded by the material of the first component 10f is shaped in such a manner that a contact point between the first component 10f and the cast-in element 11f runs in a coiled, zig-zag, wavy, or similar path.

To form the sealing device 12f, the portion of the cast-in element 11f which is surrounded by the material of the first component 10f has a cross shape in a longitudinal cross-section through the cast-in element 11f—that is, in a section along an axis of rotation of the cast-in element 11f according to FIG. 6. The cast-in element 11f has a first undercut 35f entirely surrounded by the material of the first component 10f, and a second undercut 36f entirely surrounded by the material of the first component 10f, which provide the special shape for sealing the junction 13f. Because of the first undercut 35f and the second undercut 36f, the cast-in element 11f has two radially extending projections which are completely surrounded by the material of the first component 10f. The first undercut 35f and the second undercut 36f each extend radially beyond projecting sides 21f, 22f of the cast-in element 11f.

The first undercut 35f and the second undercut 36f extend in opposite radial directions. They have a rectangular design in the longitudinal cross-section of the cast-in element 11f. In principle, the cast-in element 11f can additionally or alternatively have at least one undercut which has another geometric shape in the longitudinal cross-section of the cast-in element 11f—such as a triangular shape, a semicircular shape or the like, for example. In addition, it can be contemplated in principle that the cast-in element 11f only has one undercut to form the sealing device 12f. Furthermore, it can be contemplated in principle that the drive train device additionally has a sealing element which is included for the purpose of providing a sealing force, due to an at least partially elastic deformation, and/or due to adhesion, to seal the junction 13f.

Figure 7:
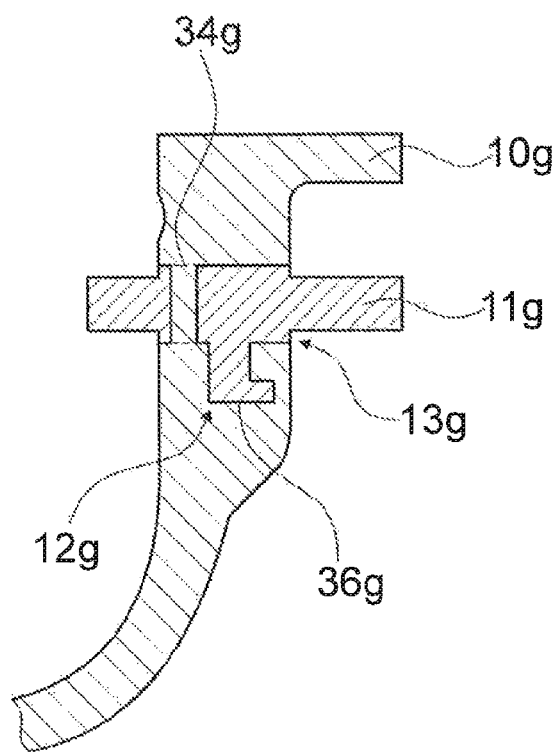
FIG. 7 shows a drive train device having a sealing device in a seventh embodiment.

FIG. 7 schematically illustrates a drive train device for a motor vehicle in a seventh embodiment. The drive train device has a first component 10g, an element 11g which is partially cast into the first component 10g, and a second component 14g which is connected to the cast-in element 11g by a material bond. To seal a junction 13g between the first component 10g and the cast-in element 11g, the drive train device has a sealing device 12g which seals the junction 13g against the inner space enclosed by the first component 10g and the second component and which is not depicted in more detail. To make a cast connection between the first component 10g and the cast-in element 11g more reliable, the cast-in element 11g has multiple material voids 34g which, once cast-in, are filled in by the material of the first component 10g.

In contrast to the previous embodiment, the portion of the cast-in element 11f which is entirely surrounded by the material of the first component 10f has an undercut 36g for the purpose of forming the sealing device 12g, designed with an L shape in a longitudinal cross-section through the cast-in element 11g. The undercut 36g has a nose which extends axially. In principle, the undercut 36g can also have a T shape or the like.

Figure 8:
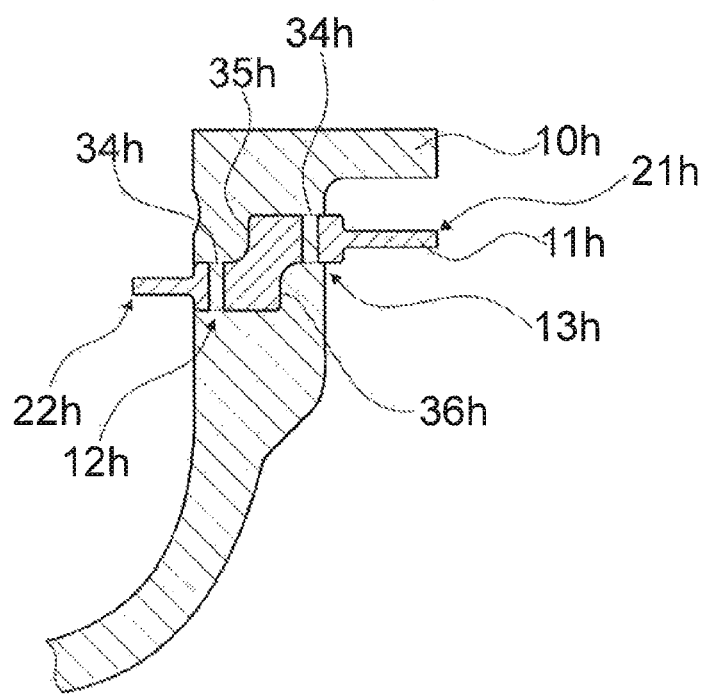
FIG. 8 shows a drive train device having a sealing device in an eighth embodiment.

FIG. 8 schematically illustrates a drive train device for a motor vehicle in an eighth embodiment. The drive train device has a first component 10h, an element 11h which is partially cast into the first component 10h, and a second component 14h which is connected to the cast-in element 11h by a material bond. To seal a junction 13h between the first component 10h and the cast-in element 11h, the drive train device has a sealing device 12h which seals the junction 13h against the inner space 15b enclosed by the first component 10h and the second component 14h. To make a cast connection between the first component 10h and the cast-in element 11h more reliable, the cast-in element 11h has multiple material voids 34h which, once cast-in, are filled in by the material of the first component 10h.

In contrast to the previous embodiment, the cast-in element 11h has a first undercut 35h and a second undercut 36h which give the portion of the cast-in element 11f which is surrounded by the material of the first component 10f an S shape when viewed in a longitudinal cross-section. To form the sealing device 12h, the portion of the cast-in element 11f which is surrounded by the material of the first component 10f is shaped in such a manner that a first axially projecting side 21h of the cast-in element 11h and a second axially projecting side 22*h* of the cast-in element 11*h* are arranged at different radial planes with respect to each other.

LIST OF REFERENCE NUMBERS

- 10 component
- 11 cast-in element
- 12 sealing device
- 13 junction
- 14 component
- 15 inner space
- 16 sealing element
- 17 sealing element receptacle
- 18 movement constraint
- 19 movement constraint
- 20 torque converter
- 21 side
- 22 side
- 23 balancing element
- 24 component
- 25 component
- 26 component
- 27 component
- 28 scooping device
- 29 material void
- 30 material void
- 31 scoop ring
- 32 material constriction
- 33 projection
- 34 material void
- 35 undercut
- 36 undercut

The invention claimed is:

1. A drive train device for a motor vehicle, comprising:
a first component for a purpose of transmitting a torque;
a cast-in element which is partially cast into the first component, wherein the cast-in element is for the purpose of transmitting the torque, wherein the first component and the cast-in element are made of different materials;
wherein the first component is indirectly connected, in a manner which transmits torque, to a second component which is for the purpose of transmitting the torque, via the cast-in element such that the torque can only be transmitted between the first component and the second component via the cast-in element; and
a sealing device, wherein the sealing device seals a junction between the first component and the cast-in element;
wherein the sealing device has a sealing element which is disposed between the first component and the cast-in element.

2. The drive train device according to claim 1, wherein the second component together with the first component at least partially enclose an inner space and wherein the sealing device seals the junction and the inner space against each other.

3. The drive train device according to claim 1, wherein the sealing device provides a sealing force due to an at least partially elastic deformation and/or due to adhesion to seal the junction.

4. The drive train device according to claim 1, wherein the first component has a sealing element receptacle which at least partially receives the sealing element.

5. A drive train device for a motor vehicle, comprising:
a first component for a purpose of transmitting a torque;
a cast-in element which is partially cast into the first component, wherein the cast-in element is for the purpose of transmitting the torque, wherein the first component and the cast-in element are made of different materials;
wherein the first component is indirectly connected, in a manner which transmits torque, to a second component which is for the purpose of transmitting the torque, via the cast-in element such that the torque can only be transmitted between the first component and the second component via the cast-in element; and
a sealing device, wherein the sealing device seals a junction between the first component and the cast-in element;
wherein the sealing device has a sealing element which is disposed between the first component and the second component to provide a seal;
wherein the first component has a sealing element receptacle which at least partially receives the sealing element;
wherein the second component at least partially engages into the sealing element receptacle.

6. A drive train device for a motor vehicle, comprising:
a first component for a purpose of transmitting a torque;
a cast-in element which is partially cast into the first component, wherein the cast-in element is for the purpose of transmitting the torque, wherein the first component and the cast-in element are made of different materials;
wherein the first component is indirectly connected, in a manner which transmits torque, to a second component which is for the purpose of transmitting the torque, via the cast-in element such that the torque can only be transmitted between the first component and the second component via the cast-in element; and
a sealing device, wherein the sealing device seals a junction between the first component and the cast-in element;
wherein the sealing device has a sealing element which is disposed between the first component and the second component to provide a seal;
wherein the first component has a sealing element receptacle which at least partially receives the sealing element;
wherein the first component has a movement constraint for the sealing element wherein the movement constraint impedes a movement of the sealing element in the sealing element receptacle.

7. A drive train device for a motor vehicle, comprising:
a first component for a purpose of transmitting a torque;
a cast-in element which is partially cast into the first component, wherein the cast-in element is for the purpose of transmitting the torque, wherein the first component and the cast-in element are made of different materials;
wherein the first component is indirectly connected, in a manner which transmits torque, to a second component which is for the purpose of transmitting the torque, via the cast-in element such that the torque can only be transmitted between the first component and the second component via the cast-in element; and
a sealing device, wherein the sealing device seals a junction between the first component and the cast-in element;

wherein the sealing device has a sealing element which is disposed between the first component and the second component to provide a seal;

wherein the first component has a sealing element receptacle which at least partially receives the sealing element;

wherein the sealing element receptacle is a material void which is open toward the second component and has an annular shape in a form of a groove which is open in an axial direction;

wherein the sealing element receptacle is disposed radially inside the cast-in element with respect to an axis of rotation of the first component and the second component;

wherein the sealing element receptacle is bounded axially in a direction facing away from the second component and radially in a direction facing the axis of rotation by the first component;

wherein in a direction facing away from the axis of rotation, the sealing element receptacle is bounded radially by the cast-in element;

wherein, to form the sealing element receptacle, the first component has a projection which is disposed radially below the cast-in element and which extends axially from a surface of the first component which faces the second component in a direction of the second component, wherein the sealing element is supported on the projection and is disposed on the projection, and wherein the sealing element receptacle is formed by casting of the first component.

* * * * *